United States Patent
Schmitz et al.

(10) Patent No.: US 12,486,721 B2
(45) Date of Patent: Dec. 2, 2025

(54) CORE DRILL ASSEMBLY

(71) Applicant: MILWAUKEE ELECTRIC TOOL CORPORATION, Brookfield, WI (US)

(72) Inventors: Jonathan E. Schmitz, Wauwatosa, WI (US); Terry L. Timmons, Oconomowoc, WI (US); Karly M. Schober, Milwaukee, WI (US); Dane Laitinen, Wauwatosa, WI (US); Andrew Medeiros-Nicholson, Wauwatosa, WI (US); Paul W. Eiche, Oconomowoc, WI (US); Casey A. Ketterhagen, Hartland, WI (US); Sara Burch, Milwaukee, WI (US); Guo Qian Qin, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/627,045

(22) Filed: Apr. 4, 2024

(65) Prior Publication Data
US 2024/0247545 A1      Jul. 25, 2024

Related U.S. Application Data

(63) Continuation of application No. 17/524,605, filed on Nov. 11, 2021, now Pat. No. 11,982,184.
(Continued)

(30) Foreign Application Priority Data

Feb. 10, 2021 (CN) .......................... 202120373677.5

(51) Int. Cl.
*F16M 11/00* (2006.01)
*B25H 1/00* (2006.01)
(Continued)

(52) U.S. Cl.
CPC ........... *E21B 7/027* (2013.01); *B25H 1/0042* (2013.01); *E21B 3/02* (2013.01)

(58) Field of Classification Search
CPC . E21B 7/027; E21B 3/02; E21B 25/00; B25H 1/0042; B23B 2250/12; B23B 45/003; B23B 45/008
See application file for complete search history.

(56) References Cited

U.S. PATENT DOCUMENTS 1,791,073 A    2/1931  Manley
2,938,411 A *  5/1960  Herfurth .............. B25H 1/0071
                                                    408/712

(Continued)

FOREIGN PATENT DOCUMENTS

DE    2238838 A1    2/1974
DE    2834286 A1    3/1979
(Continued)

OTHER PUBLICATIONS

International Search Report and Written Opinion for Application No. PCT/US2021/059011 dated Feb. 24, 2022 (13 pages).
(Continued)

*Primary Examiner* — Amy J. Sterling
(74) *Attorney, Agent, or Firm* — Michael Best & Friedrich LLP

(57) ABSTRACT

A drill stand includes a base supportable upon a mounting surface, a mast defining a longitudinal axis and extending upward from the base, a carriage moveably coupled to the mast and configured to support a core drill thereon, a spindle assembly for moveably adjusting the carriage along the mast, a handle assembly for rotating the spindle assembly, and a lock assembly that is operable to secure the carriage in a selected position on the mast. The lock assembly includes a first adjustment dial positioned on a first side of the carriage, a second adjustment dial positioned on a second
(Continued)

side of the carriage, and a locking member operably coupled to the first and second adjustment dials to selectively secure the carriage on the mast.

8 Claims, 10 Drawing Sheets

Related U.S. Application Data

(60) Provisional application No. 63/113,505, filed on Nov. 13, 2020.

(51) Int. Cl.
*E21B 3/02* (2006.01)
*E21B 7/02* (2006.01)

(56) References Cited

U.S. PATENT DOCUMENTS

| | | | |
|---|---|---|---|
| 3,412,813 A * | 11/1968 | Johnson | E21B 7/027 173/141 |
| 3,456,738 A | 7/1969 | Harry | |
| 3,464,655 A | 9/1969 | Schuman | |
| 3,663,115 A | 5/1972 | Vindez et al. | |
| 3,915,241 A | 10/1975 | Bieri | |
| 4,013,133 A | 3/1977 | Bieri | |
| 4,468,159 A * | 8/1984 | Oster | B23Q 11/1007 125/20 |
| 4,540,149 A | 9/1985 | Rupprecht et al. | |
| 4,582,460 A | 4/1986 | Silverberg et al. | |
| 4,923,344 A | 5/1990 | Bieri | |
| 5,062,746 A | 11/1991 | Deremo | |
| 5,302,045 A | 4/1994 | Johnsen | |
| 5,342,153 A | 8/1994 | Dobkins | |
| 5,558,476 A | 9/1996 | Uchida et al. | |
| 5,794,724 A | 8/1998 | Moller | |
| 5,807,034 A | 9/1998 | Perlmutter et al. | |
| 5,807,038 A | 9/1998 | Skinner | |
| 5,888,031 A | 3/1999 | Buck et al. | |
| 5,899,644 A | 5/1999 | Buck et al. | |
| 6,039,038 A | 3/2000 | Buck et al. | |
| 6,102,135 A | 8/2000 | Shaw | |
| 6,568,876 B2 | 5/2003 | Augustin | |
| 6,692,201 B2 | 2/2004 | Soderman | |
| 6,869,258 B2 | 3/2005 | Flock et al. | |
| 6,887,018 B2 | 5/2005 | Ostermeier | |
| 6,902,347 B2 | 6/2005 | Stolz et al. | |
| 6,932,546 B2 | 8/2005 | Ohlendorf | |
| 7,001,116 B2 | 2/2006 | Kozak | |
| 7,070,366 B2 | 7/2006 | Reichenberger et al. | |
| 7,073,797 B2 | 7/2006 | Gaul | |
| 7,108,459 B1 | 9/2006 | Mueller | |
| 7,219,753 B2 | 5/2007 | Gaul | |
| 7,220,091 B2 | 5/2007 | Takahashi et al. | |
| 7,267,512 B1 | 9/2007 | Mueller | |
| 7,484,578 B2 | 2/2009 | Duncan | |
| 7,658,242 B2 | 2/2010 | Duncan | |
| 7,766,583 B2 | 8/2010 | Kozak | |
| 8,201,548 B2 | 6/2012 | van Taack-Trakranen et al. | |
| 8,245,997 B2 | 8/2012 | Baratta | |
| 8,328,475 B2 | 12/2012 | Naughton et al. | |
| 8,813,588 B2 | 8/2014 | Sattler | |
| 9,061,414 B2 | 6/2015 | Sattler | |
| 9,789,600 B2 | 10/2017 | Jönsson et al. | |
| 10,012,243 B2 | 7/2018 | Li | |
| 10,207,338 B2 | 2/2019 | Reichenberger et al. | |
| 10,350,745 B2 | 7/2019 | Zhang | |
| 10,799,959 B2 | 10/2020 | Carlson et al. | |
| 10,821,525 B2 | 11/2020 | Carlson et al. | |
| 11,746,927 B2 * | 9/2023 | Sergison | B28B 1/001 137/615 |
| 2007/0086868 A1 | 4/2007 | Ray | |
| 2007/0217879 A1 | 9/2007 | Larsson | |
| 2010/0290848 A1 | 11/2010 | Baratta | |
| 2015/0352708 A1 | 12/2015 | van Taack-Trakranen | |
| 2019/0321896 A1 | 10/2019 | Carlson et al. | |
| 2020/0406373 A1 | 12/2020 | Carlson et al. | |
| 2021/0008647 A1 | 1/2021 | Carlson et al. | |
| 2022/0314426 A1 | 10/2022 | Medeiros-Nicholson et al. | |
| 2023/0071043 A1 | 3/2023 | Kugler et al. | |

FOREIGN PATENT DOCUMENTS

| | | |
|---|---|---|
| DE | 3517791 A1 | 11/1986 |
| DE | 9002854 U1 | 5/1990 |
| DE | 3434260 C2 | 4/1996 |
| DE | 29604902 U1 | 5/1996 |
| DE | 29505693 U1 | 7/1996 |
| DE | 29615091 U1 | 11/1996 |
| DE | 29703693 U1 | 5/1997 |
| DE | 29802393 U1 | 6/1998 |
| DE | 29713139 U1 | 11/1998 |
| DE | 10064173 C1 | 6/2002 |
| DE | 20301429 U1 | 6/2003 |
| DE | 20318946 U1 | 2/2004 |
| DE | 19703910 B4 | 7/2005 |
| DE | 102011122028 A1 | 6/2013 |
| DE | 10325073 B4 | 1/2015 |
| DE | 102015105288 A1 | 10/2016 |
| EP | 0392390 A2 | 10/1990 |
| EP | 0236536 B1 | 3/1991 |
| EP | 0791424 B1 | 6/2003 |
| EP | 1600259 B1 | 3/2007 |
| EP | 2436491 A2 | 4/2012 |
| EP | 2818282 B1 | 8/2016 |
| EP | 3495080 A1 | 6/2019 |
| EP | 3505283 A1 | 7/2019 |
| JP | H0585597 U | 11/1993 |
| JP | H0685706 U | 12/1994 |
| JP | 10328916 A | 12/1998 |
| JP | 2005342829 A | 12/2005 |
| KR | 1020160072871 A | 6/2016 |
| WO | 2004069501 A2 | 8/2004 |
| WO | 2006061291 A1 | 6/2006 |
| WO | 2008026975 A1 | 3/2008 |
| WO | 2014126525 A1 | 8/2014 |
| WO | 2019008132 A1 | 1/2019 |
| WO | 2020176023 A1 | 9/2020 |

OTHER PUBLICATIONS

Partial Supplementary European Search Report for Application No. 21892822.4 dated Nov. 12, 2024 (17 pages).

* cited by examiner

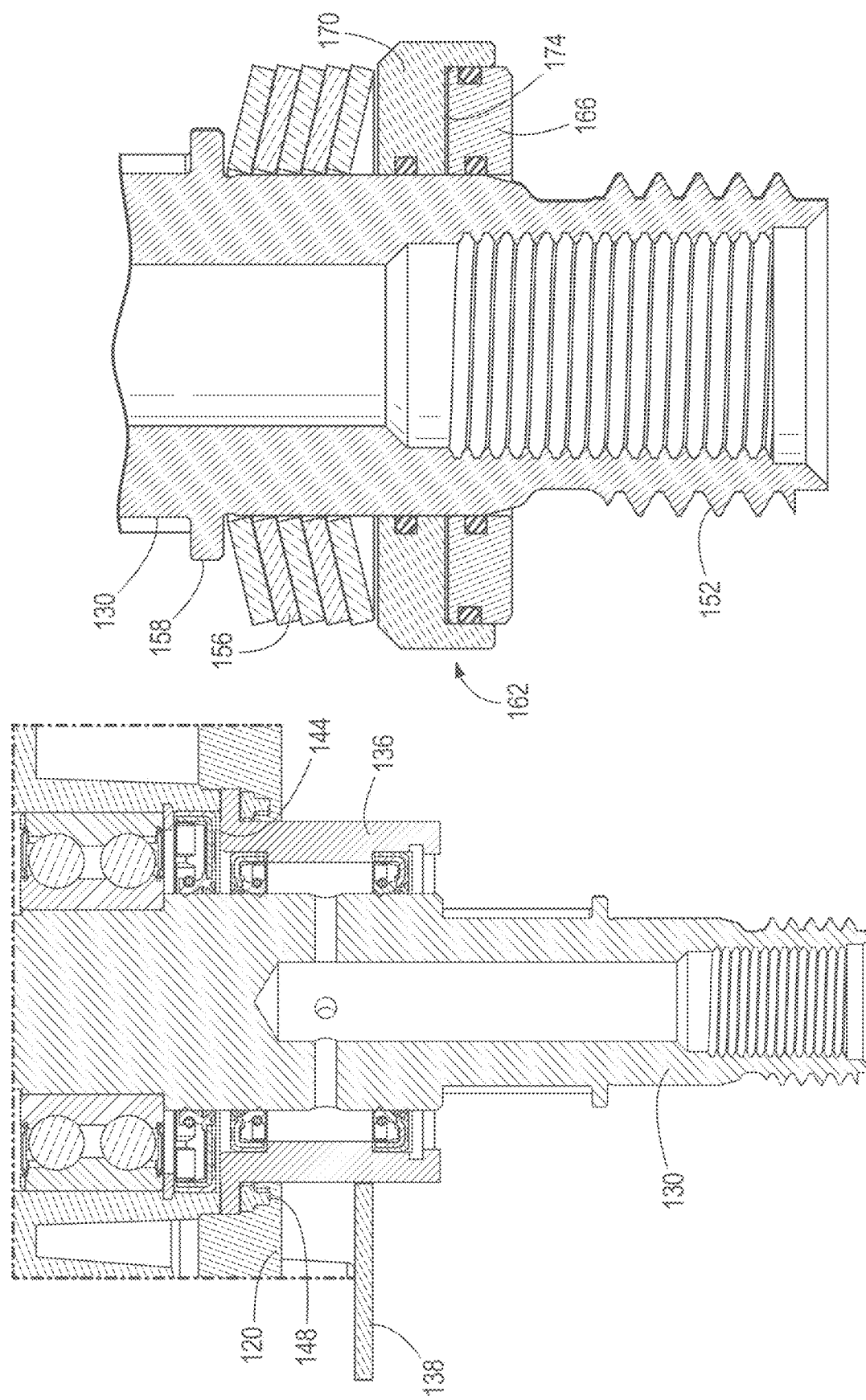

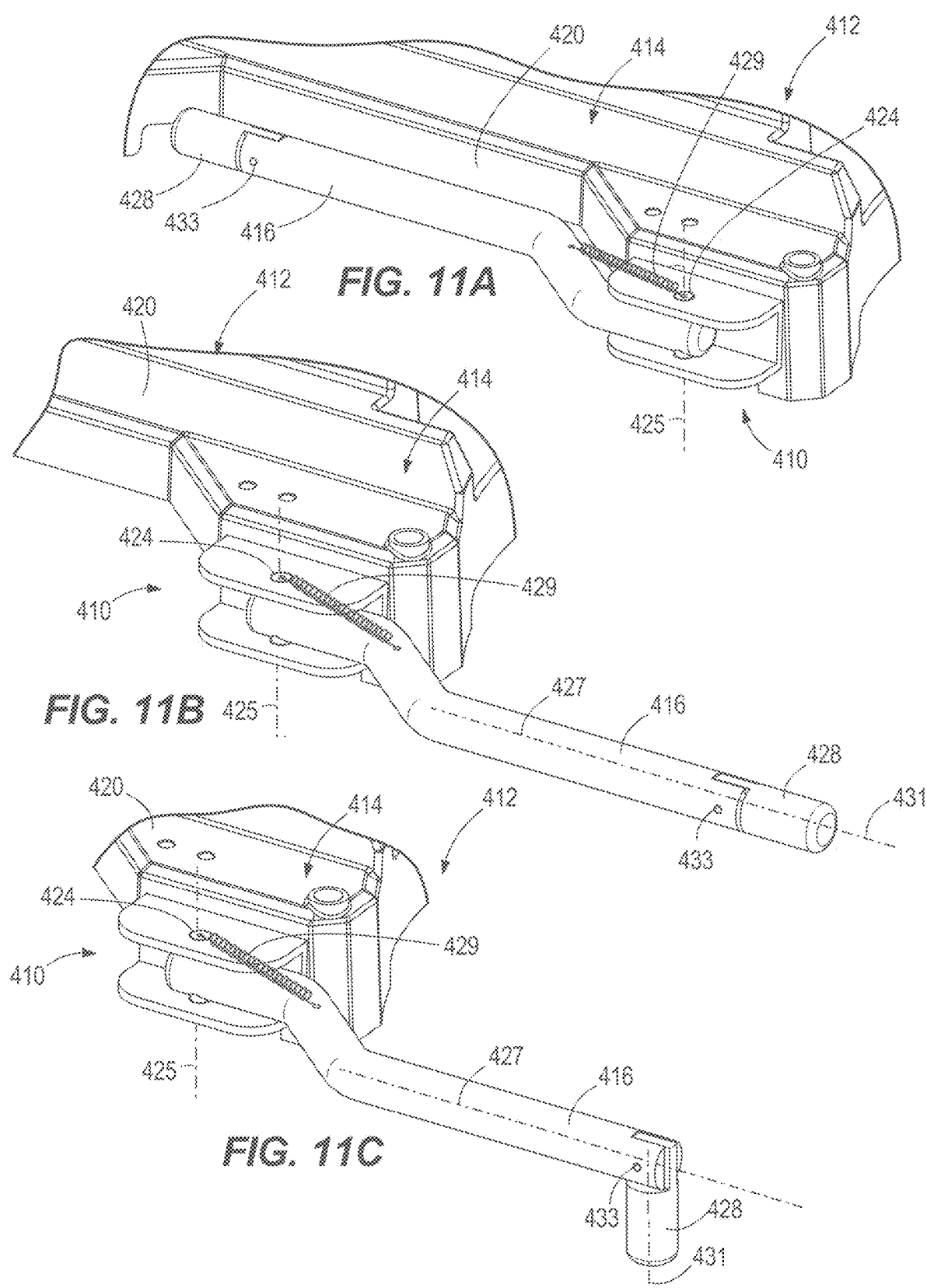

CORE DRILL ASSEMBLY

CROSS REFERENCE TO RELATED APPLICATIONS

This application is a continuation of U.S. patent application Ser. No. 17/524,605 filed Nov. 11, 2021, now U.S. Pat. No. 11,982,184, which claims priority to U.S. Provisional Patent Application No. 63/113,505 filed Nov. 13, 2020, and to Chinese Utility Model No. 202120373677.5 filed Feb. 10, 2021, now Chinese Patent No. ZL202120373677.5, the entire content of each of which is incorporated herein by reference.

FIELD OF THE INVENTION

The present invention relates a drill assembly, and more particularly to a large drill, such as a core drill, having a stand.

BACKGROUND OF THE INVENTION

Large drills, such as core drills, typically require stands upon which they can be mounted. The stands can often be mounted against a horizontal surface, such as the ground, or a vertical wall.

SUMMARY OF THE INVENTION

In one aspect, the invention provides a core drill assembly comprising a core drill and a stand upon which the core drill is mounted. The stand including a base supportable upon a mounting surface, a mast defining a longitudinal axis and extending upward from the base, a carriage moveably coupled to the mast and configured to support the core drill thereon, an at least one leg pivotably coupled to the base between a deployed position, in which the leg extends away from the base, and a stowed position, in which the leg is at least partially recessed within the base.

In some aspects, the leg includes an adjuster having a foot that supports the leg relative to the mounting surface. In some aspects, the drill assembly includes a recess formed in the base, wherein the recess is sized to receive the foot and secure the leg in the stowed position. In some aspects, the adjuster is threadably coupled to the leg to vertically adjust the foot relative to the mounting surface to level the base In another aspect, the invention provides a core drill assembly comprising a core drill and a stand upon which the core drill is mounted. The stand including a base supportable upon a mounting surface, a mast defining a longitudinal axis and extending upward from the base, a carriage moveably coupled to the mast and configured to support the core drill thereon with a core bit, and a pair of legs integrally formed with the base and at least partially surrounding the core bit when the core drill is mounted to the carriage.

In some aspects, the legs define an arcuate shape that partially surround the core bit. In some aspects, the legs, collectively, define a half circle. In some aspects, the drill further includes a handle coupled to a top portion of the mast. In some aspects, the handle is rotatable about the longitudinal axis. In some aspects, the drill assembly further includes a pair of wheels coupled to a rear portion of the base. In some aspects, the legs terminate at an end to define a front portion of the base, and the stand further comprises a plurality of adjusters threaded to each corner of the base and adjacent the end of each of the legs.

In another aspect, the invention provides a drill stand comprising a base supportable upon a mounting surface, a mast defining a longitudinal axis and extending upward from the base, a carriage moveably coupled to the mast and configured to support a core drill thereon, a spindle assembly for moveably adjusting the carriage along the mast, a handle assembly for rotating the spindle assembly, and a lock assembly that is operable to secure the carriage in a selected position on the mast. The lock assembly including a first adjustment dial positioned on a first side of the carriage, a second adjustment dial positioned on a second side of the carriage, and a locking member operably coupled to the first and second adjustment dials to selectively secure the carriage on the mast.

In some aspects, the lock assembly further comprises an elongated shaft coupled to the first and second adjustment dials, the elongated shaft having an eccentric portion that engages with the locking member, and a biasing member that biases the locking member into engagement with the eccentric portion. In some aspects, the locking member includes a recess that receives the eccentric portion of the shaft. In some aspects, the locking member includes a first set of teeth that selectively engage with a second set of teeth formed on the mast. In some aspects, the biasing member includes a pair of compression springs positioned on each side of the eccentric portion of the shaft. In some aspects, the compression springs extend between the locking member and a cover fastened to the carriage.

BRIEF DESCRIPTION OF THE DRAWINGS

FIG. 7 is a cross-sectional view of a portion of the core drill assembly of FIG. 1, illustrating a water jacket.

FIG. 8A is a cross-sectional view of a portion of the core drill of FIG. 1, illustrating a washer assembly coupled to an output shaft of the core drill.

FIGS. 11A-11C is a partial perspective view of a core drill assembly in accordance with a further embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
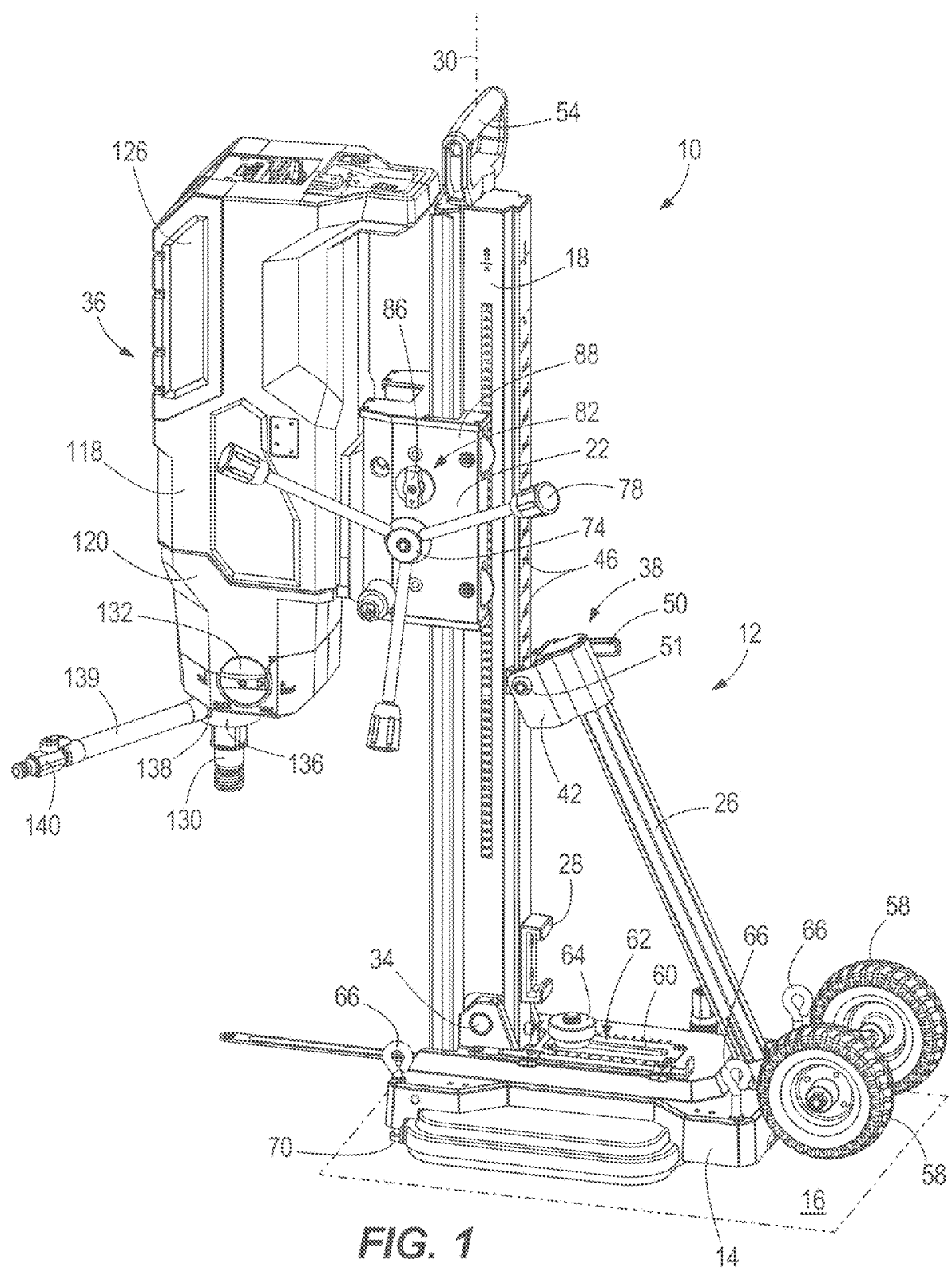
FIG. 1 is a perspective view of a core drill assembly in accordance with an embodiment of the invention, including a core drill and a stand.

FIGS. 1-4 illustrate a core drill assembly 10 including a stand 12 having a base 14 for mounting on a mounting surface 16 that can be vertical (e.g. a wall) or horizontal (e.g. the ground, as shown in FIG. 1). The stand 12 includes a mast 18, a carriage 22 that is movable along the length of the mast 18, and a support bracket 26 moveably coupled to the mast 18 and the base 14. The mast 18 defines a longitudinal axis 30 and is pivotably coupled to the base 14 to pivot about a pivot joint 34. The core drill assembly 10 also includes a core drill 36 mounted to the carriage 22.

The support bracket 26 is moveably coupled to the mast 18 via a tool-free clamping mechanism 38 that selectively locks the support bracket 26 to the mast 18. As shown in FIG. 3, the clamping mechanism 38 includes a pair of clamping arms 42 positioned on respective rails 46 on the mast 18. The rails 46 are parallel with the longitudinal axis 30 of the mast 18. A handle 50 can be rotated to tighten the clamping arms 42 to the rails 46. Specifically, a bolt 51 (FIG. 1) is coupled for rotation with the handle 50. The bolt 51 extends through and is rotatable relative to the clamping arms 42 to selectively lock or unlock the support bracket 26 with respect to the mast 18 so the support bracket 26 is movable between an operational position (FIG. 1-4) and a stowed position (not shown). When the support bracket 26 is locked with respect to the mast 18, an operator may grasp the support bracket 26 to carry the drill assembly 10.

As shown in FIGS. 1-4, the drill stand 12 includes a battery mount 28 that selectively receives a battery pack. The battery mount 28 is attached to the mast 18 within a space bounded by the mast 18, the support bracket 26, and the base 14. In the illustrated embodiment, the core drill 36 includes a battery pack 126, and the battery mount 28 may be used to store a spare (charged) battery pack ready for the core drill 36 in case the battery pack 126 on the core drill 36 requires recharging. In other embodiments, the battery mount 28 may receive a battery pack that can power the core drill 36. In other embodiments (not shown), the battery mount 28 may be arranged on the support bracket 26 but within the same space bounded by the mast 18, the support bracket 26, and the base 14 to provide protection for the battery pack.

With continued reference to FIGS. 1-4, the stand 12 further includes a handle 54 coupled to a top portion of the mast 18. In the illustrated embodiment, the handle 54 is a D-shaped handle. In some embodiments, the handle 54 may be rotatable about the longitudinal axis 30. The base 14 further includes a pair of wheels 58 coupled to a rear portion of the base 14 to aid with the movement of the drill assembly 10 on the mounting surface 16. The wheels 58 may engage the mounting surface 16 when the base 14 is pivoted relative to the mounting surface 16. For example, the operator may grasp the handle 54 to pivot the base 14 relative to the mounting surface 16 and roll the drill assembly 10 to a desired location on the mounting surface 16 using the wheels 58.

As shown in FIGS. 1-4, the base 14 includes a wear plate 60 having an elongated slot 62 through which a mounting bolt 64 may be inserted to secure the base 14 to the mounting surface 16 by, for example, setting the mounting bolt through the wear plate 60 and into a bore created in the mounting surface 16. The base 14 also includes a plurality of adjusters 66 positioned at each corner of the base 14. The adjusters 66 may be threadably adjusted with respect to the base 14 in order to vertically adjust respective feet 70 attached to the adjusters 66 with respect to the base 14. In the illustrated embodiment, there are four adjusters 66, one in each corner of the base 14, but in other embodiments there may be more or fewer adjusters 66, and the adjusters may be in different locations on the base 14. The operator may adjust the height and orientation of the base 14 with respect to the mounting surface 16 by adjusting one or more of the adjusters 66 with respect to the base 14.

Figure 2:
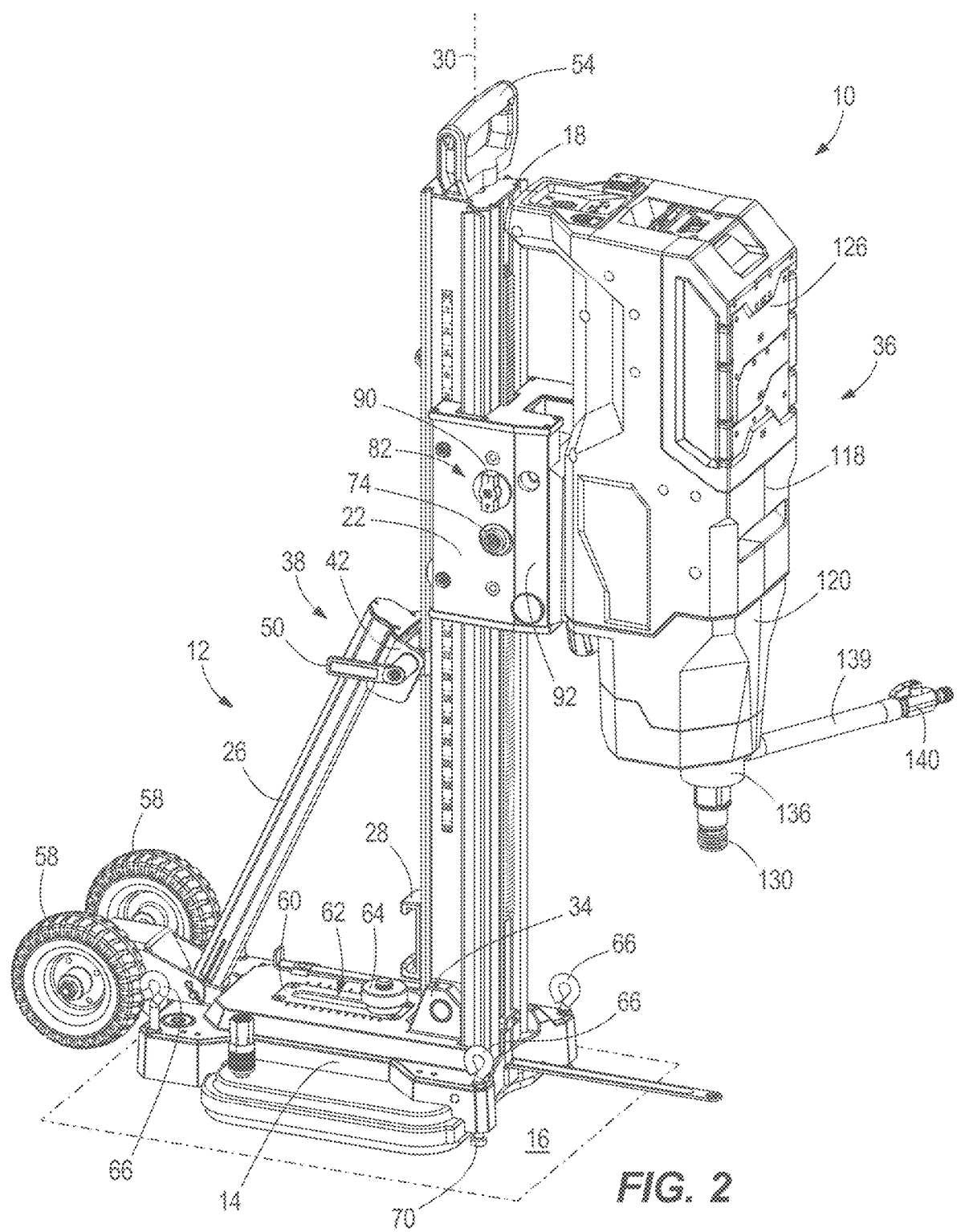
FIG. 2 is another perspective view of the core drill assembly of FIG. 1.
Figure 3:
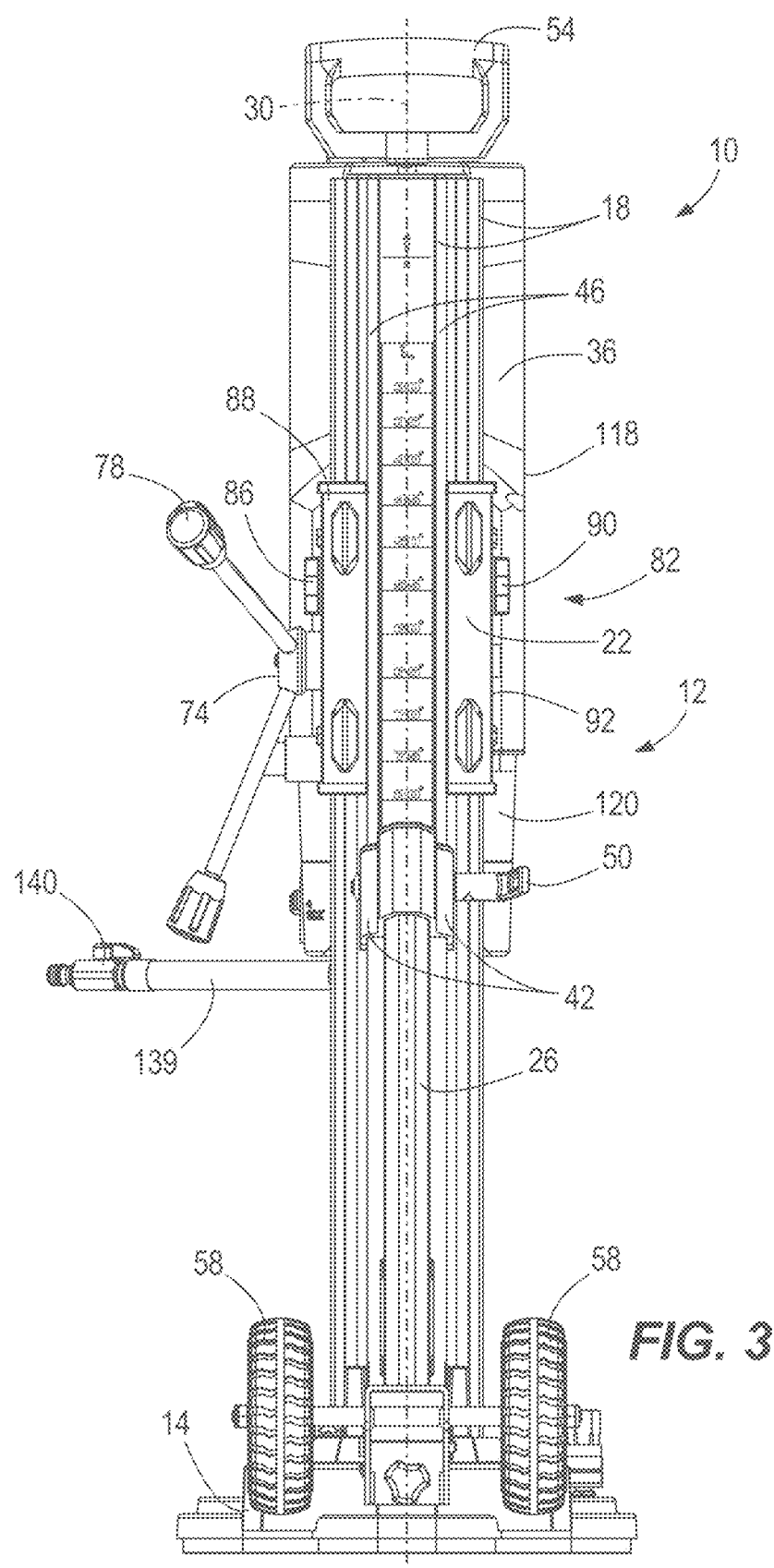
FIG. 3 is a rear view of the core drill assembly of FIG. 1.
Figure 4:
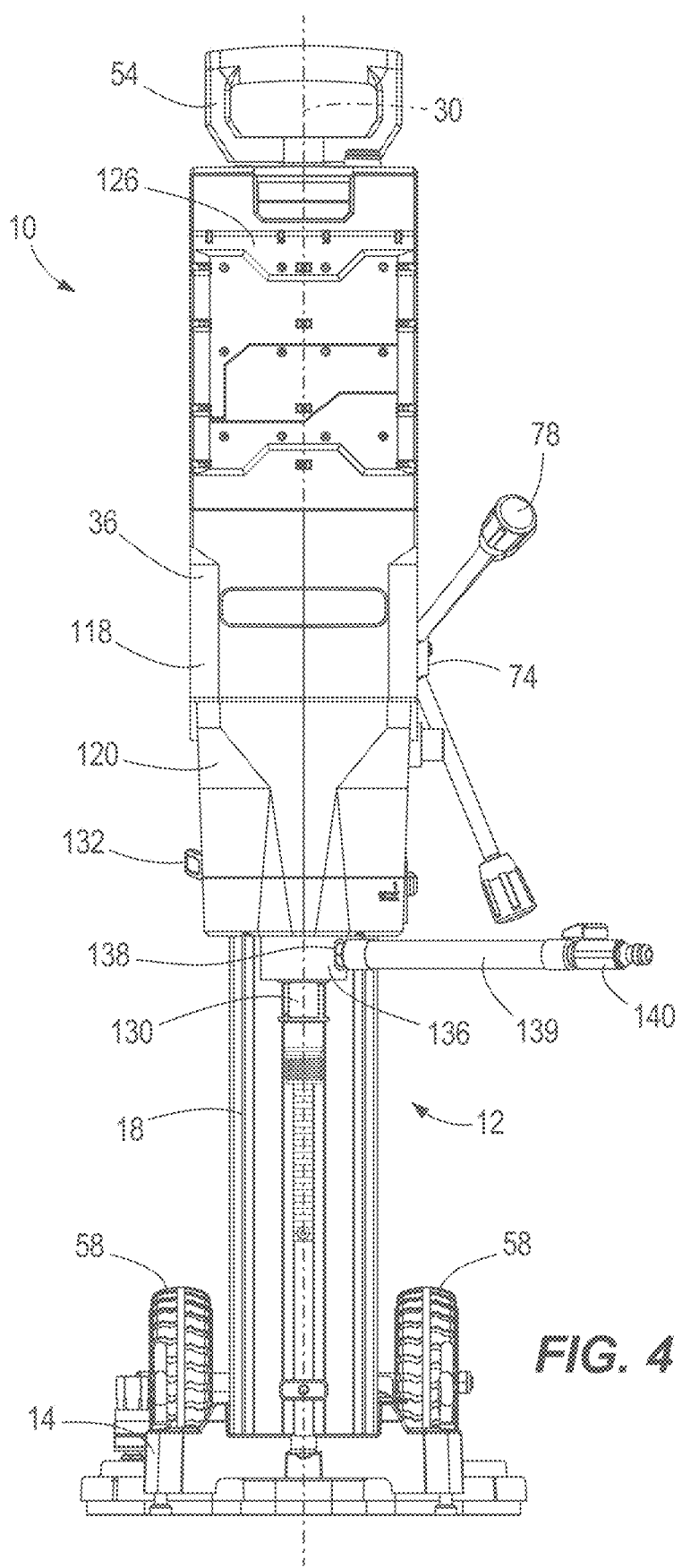
FIG. 4 is a front view of the core drill assembly of FIG. 1.

As shown in FIGS. 1-3, the carriage 22 includes a spindle assembly 74 for moveably adjusting the carriage 22 along the mast 18, a handle assembly 78 for rotating the spindle assembly 74, and a lock assembly 82 (shown in more detail in FIG. 5) that is operable to secure the carriage 22 in a selected position on the mast 18. The handle assembly 78 can be interchangeably coupled to the spindle assembly 74 on either side of the carriage 22 and is configured to translate the core drill 36 relative to the mast 18. In some embodiments, the spindle assembly 74 may include a brake mechanism that prevents the handle assembly 78 from rotating when the operator is not holding the handle assembly 78. The lock assembly 82 includes a first adjustment dial 86 positioned on a first side 88 (FIG. 1) of the carriage 22 and a second adjustment dial 90 positioned on a second side 92 (FIG. 2) of the carriage 22. The adjustment dials 86, 90 are operably coupled to a lock mechanism 94 (FIG. 5) to selectively secure the carriage 22 on the mast 18. As a result, the operator may actuate the lock assembly 82 from either side of the drill assembly 10.

Figure 5:
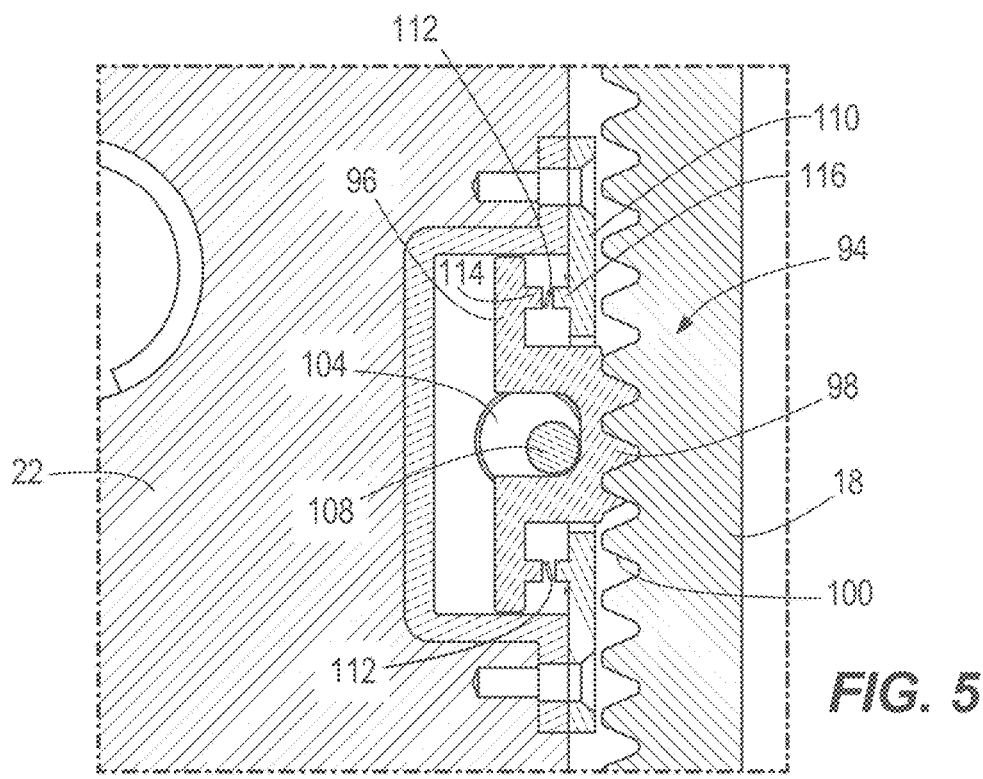
FIG. 5 is a cutaway view of a locking mechanism within a carriage of the stand of FIG. 1.

Now with reference to FIG. 5, the lock mechanism 94 includes a locking member 96 having a plurality of teeth 98 that selectively engage with teeth 100 of the mast 18, an elongated shaft 104 coupled to the dials 86, 90 and having an eccentric portion 108 that engages with the locking member 96, and a biasing member (e.g., compression springs 112) that biases the locking member 96 into engagement with the eccentric portion 108 of the shaft 104. In the illustrated embodiment, the locking member 96 has a U-shaped structure that defines a recess that receives the eccentric portion 108 of the shaft 104. The compression springs 112 are positioned on each side of the eccentric portion 108 of shaft 104 and extend between the locking member 96 and a cover 110 fastened to the carriage 22. In the illustrated embodiment, the locking member 96 and the cover 110 each include protrusions 114, 116 and the springs 112 are positioned between the respective protrusions 114, 116. The shaft 104 is connected to the first and second adjustment dials 86, 90 to allow the operator to adjust the lock assembly 82 between a locked state (FIG. 6) and an unlocked state (not shown). In the unlocked state, the eccentric portion 108 of the shaft 104 is rotated approximately 180 degrees from its position shown in FIG. 5, permitting the springs 112 to rebound and push the locking member 96 away from the mast 18. As a result, the teeth 98 of the locking member 96 are disengaged from the teeth 100 of the mast 18 so the carriage 22 can move relative to the mast 18. In the locked state of the lock assembly 82 shown in FIG. 5, the eccentric portion 108 of the shaft 104 pushes the locking member 96 toward the mast 18, causing the teeth 98, 100 to engage for holding the carriage 22 in a selected position relative to the mast 18.

Figure 6:
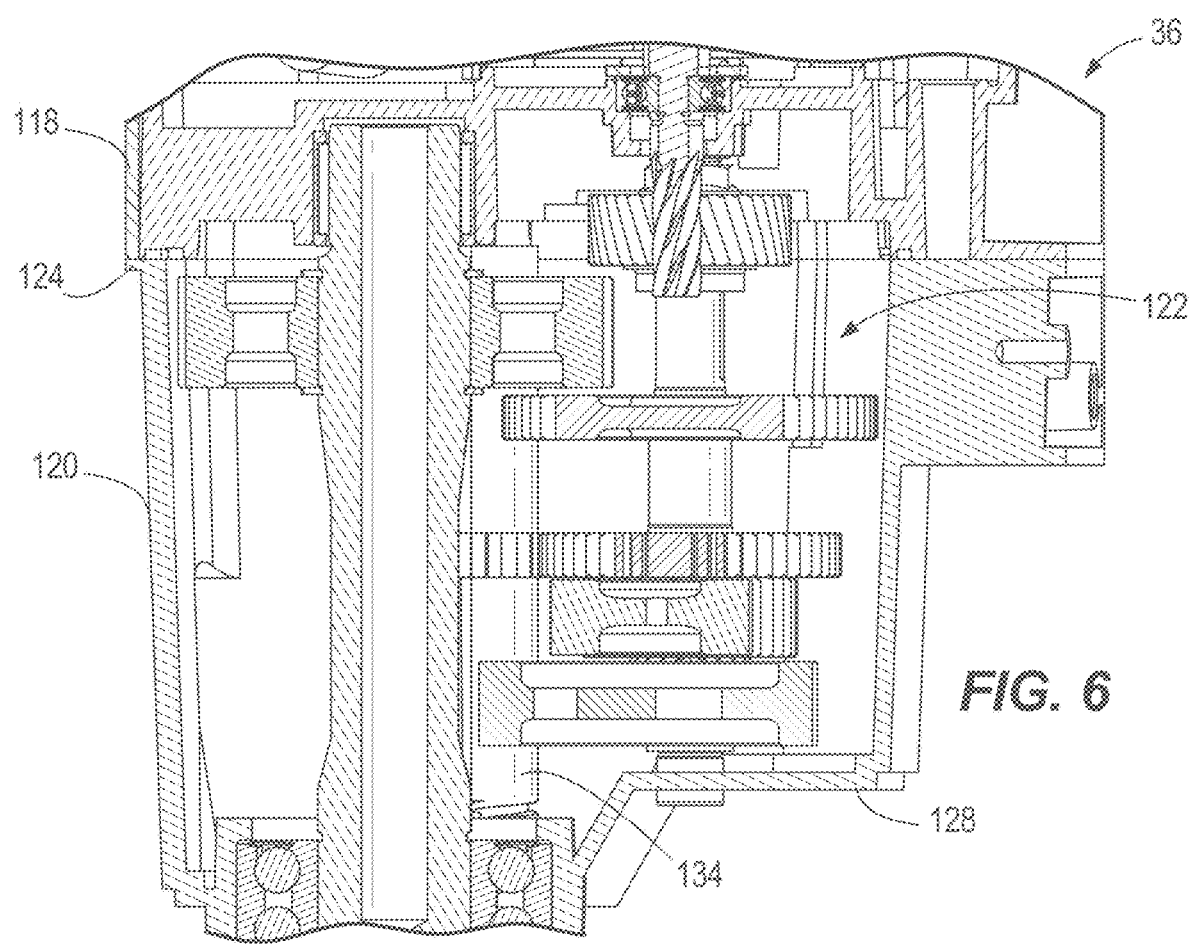
FIG. 6 is a cross-sectional view of a drive mechanism of the core drill of FIG. 1.

Now with reference to FIGS. 1 and 6, the core drill 36 includes a main body housing 118, a drive mechanism housing 120 enclosing a drive mechanism 122 (FIG. 6), a battery receptacle formed in the housing 118 that receives the battery pack 126, and an output shaft 130 coupled to the drive mechanism 122. The drive mechanism housing 120 having a first, top portion 124 coupled main body housing 118 and a second, bottom portion 128 opposite the first portion 124. The core drill 36 further includes a shifting actuator 132 (FIG. 1) coupled to the drive mechanism housing 120. The shifting actuator 132 is operable to change a gear reduction of the drive mechanism 122. In the illustrated embodiment, the drive mechanism 122, as shown in FIG. 6, is a four-stage drive mechanism that includes a pressurized lubrication system. The drive mechanism housing 120 may be sealed and filled with a lubricant, such as oil. In the illustrated embodiment, approximately 25-30 percent of the internal volume of the drive mechanism housing 120 is filled with oil. The drive mechanism 122 further includes a pickup shaft 134 that recirculates oil from the second, bottom portion 128 of the drive mechanism housing 120 towards the second, top portion 124 and disperses the oil on the top of the drive mechanism 122.

With reference to FIGS. 1 and 7, the core drill 36 includes a water jacket 136 surrounding the output shaft 130 to supply water to the interior of the output shaft 130 and to a connected core bit (FIG. 8B) to abate dust formation during a coring operation. The water jacket 136 includes an inlet 138 that can be operably coupled to a water source (e.g., a hose) for supplying water to the output shaft 130. In the illustrated embodiment, the core drill assembly 10 includes an auxiliary hose 139 having a first end connected to the inlet 138 and an opposite, second end connected to a valve 140, which has a fitting that is connectable to another hose for supplying water to the water jacket 136. As explained in further detail below, the water jacket 136 is rotatable relative to the drive mechanism housing 120 in a tool-free manner to reposition the inlet 138, and therefore the auxiliary hose 139, relative to the core drill 36 and the stand 12 to adjust for the environment in which the core drill assembly 10 is used.

With reference to FIG. 7, the core drill 36 further includes friction shims 144 and gaskets 148 positioned between the water jacket 136 and the drive mechanism housing 120 to create a seal between the water jacket 136 and the drive mechanism housing 120. The gasket 148 may be formed of a rubber material and is configured to provide a spring force that secures the water jacket 136 within the drive mechanism housing 120. The friction shims 144 provide a controlled coefficient of friction that paired with the spring force from the gasket 148 secures the water jacket 136 in a stationary position when the output shaft 130 spins during operation of the core drill 36. At the same time, the shims 144 and the gasket 148 impart a sufficiently low frictional force that an operator can rotate the water jacket 136 without tools. As a result, the operator may adjust the angular position of the inlet 138 on the water jacket 136 relative to the core drill 36 and the stand 12 as mentioned above.

Figure 8B:
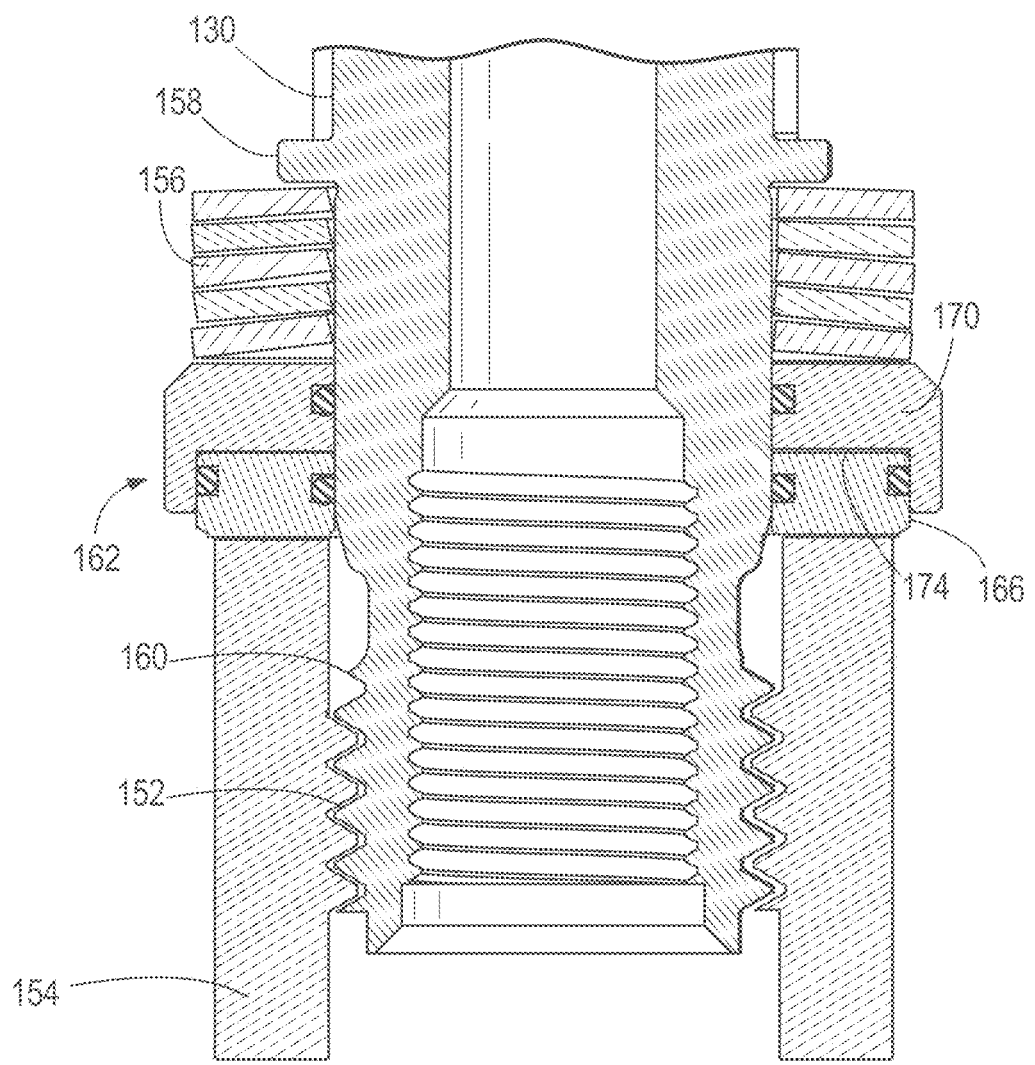
FIG. 8B is a cross-sectional view of a portion of the core drill of FIG. 1, illustrating a core bit coupled to the output shaft of the core drill.

Now with reference to FIGS. 8A and 8B, the output shaft 130 of the core drill 36 includes a threaded connection 152 to which a core bit 154 (FIG. 8B) is threaded, a washer assembly 162 above the threaded connection 152, and a biasing member 156 that biases the washer assembly 162 downward toward the core bit. The biasing member 156, in turn, is positioned between an annular flange 158 on the output shaft 130 and the washer assembly 162. In other words, the annular flange 158 is spaced from the threaded connection 152. The biasing member 156 has a sufficient stiffness that holds the washer assembly 162 against a lower retaining ring (not shown) on the output shaft 130 in absence of a core bit 154, such that a lower portion of the washer assembly 162 at least partially overlaps with the threaded connection 152. In the illustrated embodiment, the washer assembly 162 includes a lower washer 166, an upper washer 170, and a friction shim 174 positioned between the washers 166, 170. When a core bit 154 is threaded to the threaded connection 152, the top surface of the core bit 154 contacts the lower washer 166 prior to reaching the uppermost thread 160 of the threaded connection 152. During a high-torque event, such as the core bit 154 seizing within the surface 16, the output shaft 130 may continue rotating relative to the core bit 154, causing the core bit 154 to further tighten on the threaded connection 152 and move upward along the shaft 130. This also causes the washer assembly 162 to move upward along the shaft 130 and compress the biasing member 156 (FIG. 8B), which may partially compress but prevents the core bit 154 from reaching the uppermost thread of the threaded connection 152 that might otherwise cause the core bit 154 to seize on the output shaft 130. When removing the core bit 154 after a coring operation, the friction shim 174 positioned between the washers 166, 170 reduces the friction between the washers 166, 170, which allows the lower washer 166 to rotate relative to the upper washer 170 as the core bit 154 is unthreaded from the output shaft 130. After a gap is created between the core bit 154 and the lower washer 166, the core bit 154 may be easily removed from the output shaft 130 without any frictional resistance being applied. Therefore, the core bit 154 can be removed from the output shaft 130, even after a high-torque event, by hand without the use of tools.

Figure 9:
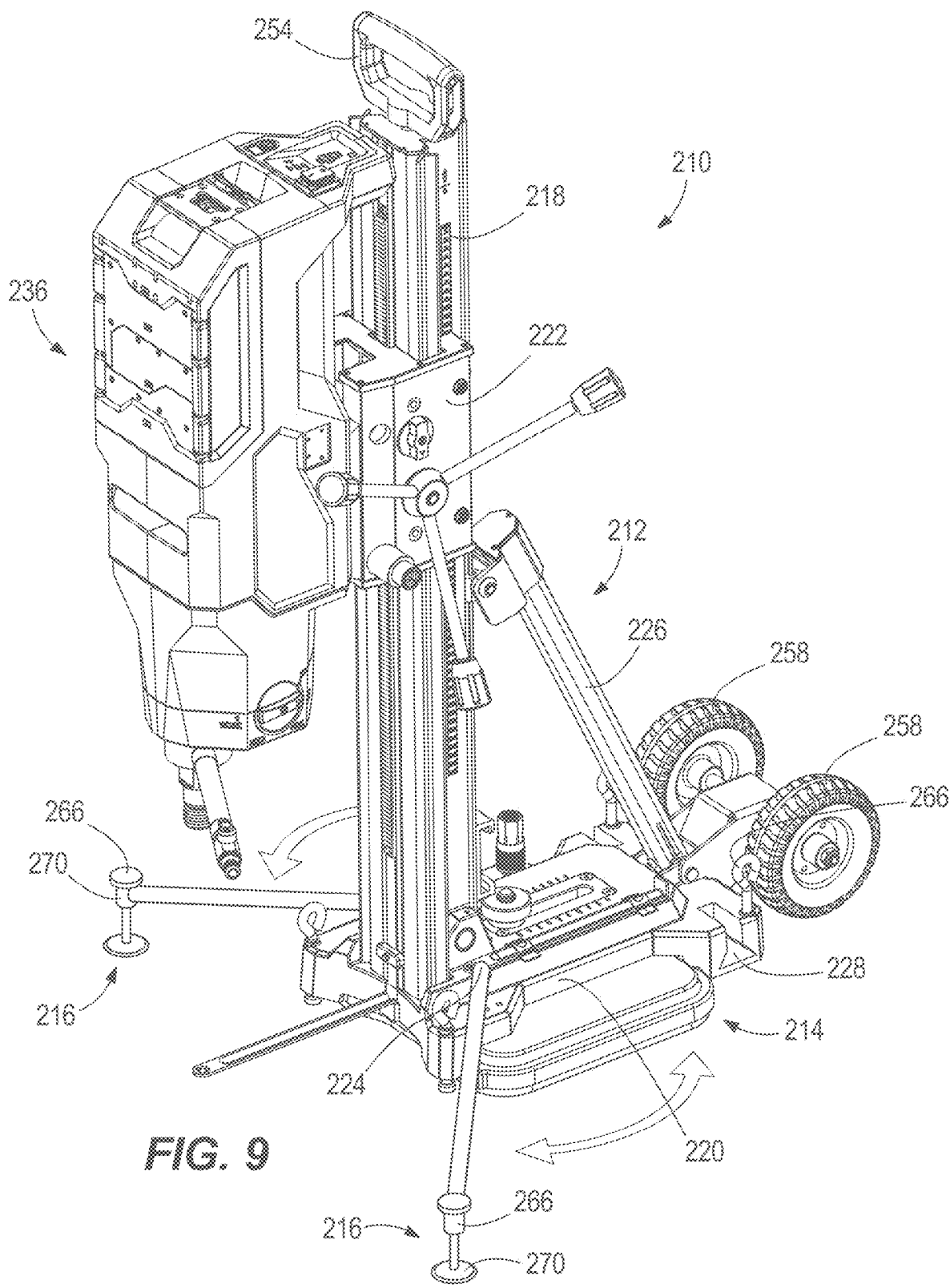
FIG. 9 is a perspective view of a core drill assembly in accordance with another embodiment of the invention.
Figure 10:
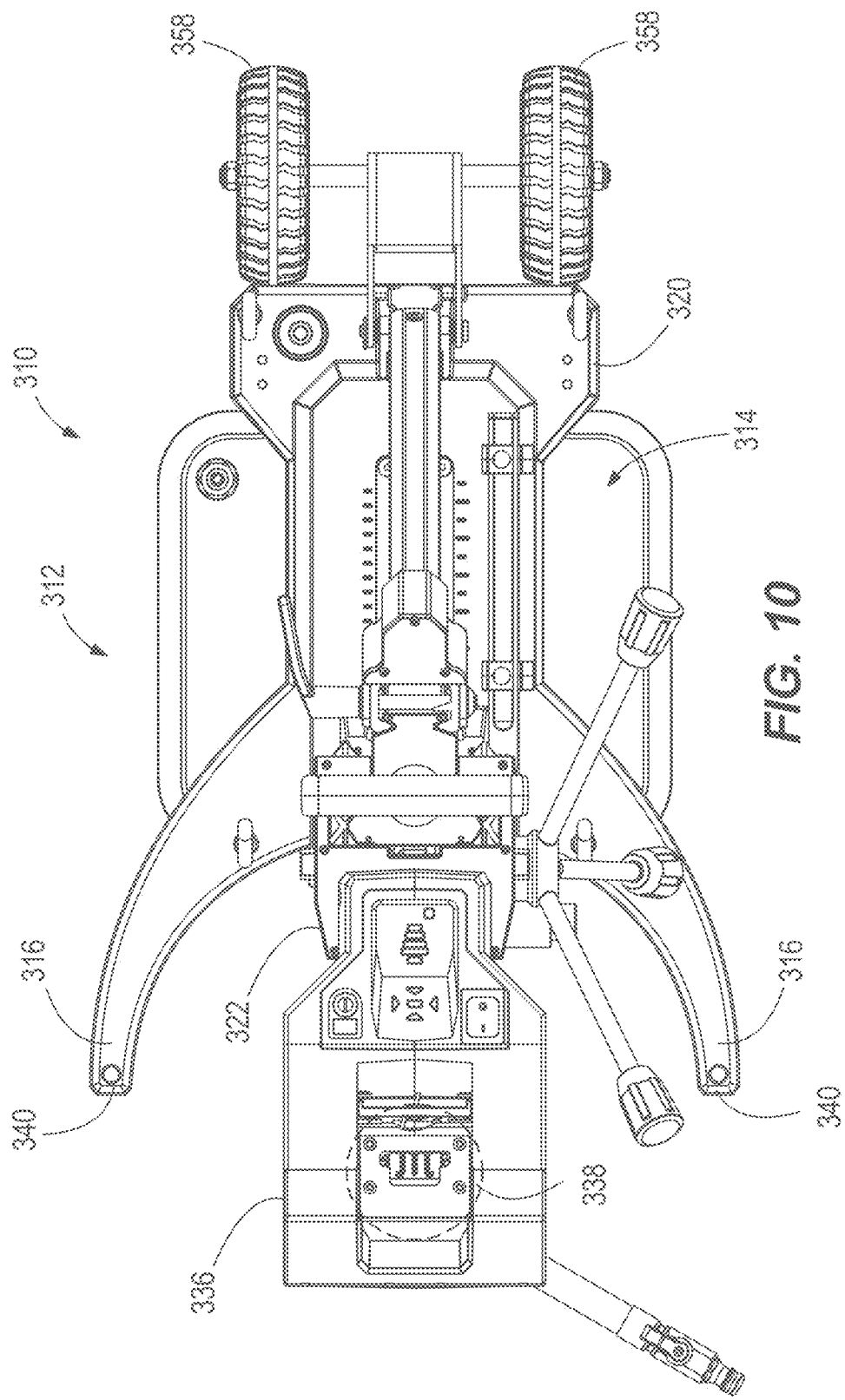
FIG. 10 is a top view of a core drill assembly in accordance with yet another embodiment of the invention.

FIGS. 9-11 illustrate additional embodiments of core drill assemblies 210, 310, 410 having stands 212, 312, 412 with various configurations of bases 214, 314, 414. Like features of the core drill assemblies 210, 310, 410 as those shown and described in FIGS. 1-4 are identified with like reference numerals plus "200," "300," and "400," respectively, and only the differences between the various embodiments will be discussed herein.

FIG. 9 illustrates a stand 212 having a base 214 including a pair of adjustable legs 216 that are pivotably coupled to a main body 220 of the base 214 at a pivot joint 224. The base 214 also includes a plurality of adjusters 266 positioned at each corner of the base 214 and the ends of the legs 216. The adjusters 266 may be threaded to the legs 216 in order to vertically adjust respective feet 270 relative to the mounting surface to level the base 214 prior to a coring operation. The legs 216 are pivotably coupled to the base 214 between a deployed position (FIG. 9), in which the legs 216 extend away from the base 214, and a stowed position (not shown), in which the legs 216 are at least partially recessed within the base 214. In the illustrated embodiment, the adjusters 266 formed on the distal end of the legs 216 are seated within a recess 228 formed on the base 214 when the legs 216 are in the stowed position. When the legs 216 are in the stowed position, the legs 216 may be graspable by the user to function as a handle.

FIG. 10 illustrates a drill assembly 310 including a core drill 336 having a core bit 338 (schematically illustrated in FIG. 10) and a stand 312 having a base 314 for a drill assembly 310. The base 314 includes a pair of legs 316 that are integrally formed with a main body 320 of the base 314 and at least partially surrounds the core bit 338 when the core drill 336 is mounted to a carriage 322. In the illustrated embodiment, the legs 316 extend outward from the main body 320 of the base 314 and define an arcuate shape that at least partially surrounds a core bit 338 (schematically illustrated in FIG. 10). In the illustrated embodiment, the legs 316 collectively define a half circle and terminate at an end 340 to define a front portion of the base 314.

The base 314 further includes a pair of wheels 358 coupled to a rear portion of the base 314 to aid with the movement of the drill assembly 310 on a mounting surface. The wheels 358 may engage the mounting surface when the base 314 is pivoted relative to the mounting surface. The base 314 also includes a plurality of adjusters (similar to the adjusters 66 in FIG. 1) positioned at each corner in the rear portion of the base 314 and adjacent the end 340 of the legs 316. The adjusters may be threadably adjusted with respect to the base 314 in order to vertically adjust respective feet attached to the adjusters with respect to the base 14.

FIG. 11A illustrates a stand 412 having a base 414 including one or more adjustable legs 416 that are pivotably coupled to a main body 420 of the base 414 at a pivot joint 424. Like the legs 216, the legs 416 are pivotable between a deployed (operational) position (FIG. 11C) and a stowed position (FIG. 11A). In the illustrated embodiment, the legs 416 are pivotable relative to the base 414 about respective pivot joints 424 that define an axis 425 oriented parallel with the longitudinal axis (e.g., longitudinal axis 30 shown in FIG. 1) of the mast. FIGS. 11A-C illustrate a side of the base 414 on which a single leg 416 is located. However, it should be appreciated that the opposite side of the base 414 may include an identical leg 416, or that a leg 416 may be positioned at each corner of the base 414.

Now with reference to FIGS. 11B and 11C, a longitudinal axis 427 extends centrally through the legs 416. Biasing members (e.g., springs 429) urge the legs 416 towards either the deployed position or the stowed position. In the illustrated embodiment, the leg 416 is biased towards the stowed position (FIG. 11A). The legs 416 include a vertical leg extension 428 formed on a distal end of each leg 416. The vertical leg extensions 428 define a longitudinal axis 431. The vertical leg extensions 428 are biased by a spring (not shown) and are pivotable relative to the legs 416 at a pivot joint 433. The vertical leg extensions 428 are pivotable between a deployed position, in which the leg extensions 428 are oriented perpendicular to the leg 416 and a stowed position, in which the leg extensions 428 are oriented coaxial with the leg 416. For example, in the stowed position (FIG. 11B), the longitudinal axis 431 of the vertical leg 428 is coaxial with the longitudinal axis 427 of the leg 416 and in the deployed position, the longitudinal axis 431 of the vertical leg 428 is perpendicular to the longitudinal axis 427 of the leg 416.

Various features of the invention are set forth in the following claims.

What is claimed is:

1. A drill assembly comprising:
    a core drill; and
    a stand upon which the core drill is mounted, the stand including
    a base supportable upon a mounting surface;
    a mast defining a longitudinal axis and extending upward from the base;
    a carriage moveably coupled to the mast and configured to support the core drill thereon;
    first and second legs pivotably coupled to the base between a deployed position, in which the legs extend away from the base, and a stowed position, the first and second legs being located on opposite sides of the base;
    a biasing member that biases each of the legs towards the stowed position; and
    a leg extension formed on a distal end of each of the legs, wherein the leg extension is pivotable between a deployed position, in which the leg extensions are oriented perpendicular to the respective legs, and a stowed position, in which the leg extensions are oriented coaxial with the respective legs.

2. The drill assembly of claim 1, wherein the first and second legs are pivotable relative to the base about respective pivot joints oriented parallel with the longitudinal axis of the mast.

3. A drill stand comprising:
    a base supportable upon a mounting surface;
    a mast defining a longitudinal axis and extending upward from the base;
    a carriage moveably coupled to the mast and configured to support a core drill thereon;
    a spindle assembly for moveably adjusting the carriage along the mast;
    a handle assembly for rotating the spindle assembly; and
    a lock assembly that is operable to secure the carriage in a selected position on the mast, the lock assembly including
    a first adjustment dial positioned on a first side of the carriage,
    a second adjustment dial positioned on a second side of the carriage, and
    a locking member operably coupled to the first and second adjustment dials to selectively secure the carriage on the mast.

4. The drill stand of claim 3, wherein the lock assembly further comprises an elongated shaft coupled to the first and second adjustment dials, the elongated shaft having an eccentric portion that engages with the locking member, and a biasing member that biases the locking member into engagement with the eccentric portion.

5. The drill stand of claim 4, wherein the locking member includes a recess that receives the eccentric portion of the shaft.

6. The drill stand of claim 5, wherein the locking member includes a first set of teeth that selectively engage with a second set of teeth formed on the mast.

7. The drill stand of claim 5, wherein the biasing member includes a pair of compression springs positioned on each side of the eccentric portion of the shaft.

8. The drill stand of claim 7, wherein the compression springs extend between the locking member and a cover fastened to the carriage.

* * * * *